May 13, 1958  A. J. HIRST  2,834,226
TORSIONAL VIBRATION DAMPERS
Filed March 26, 1956
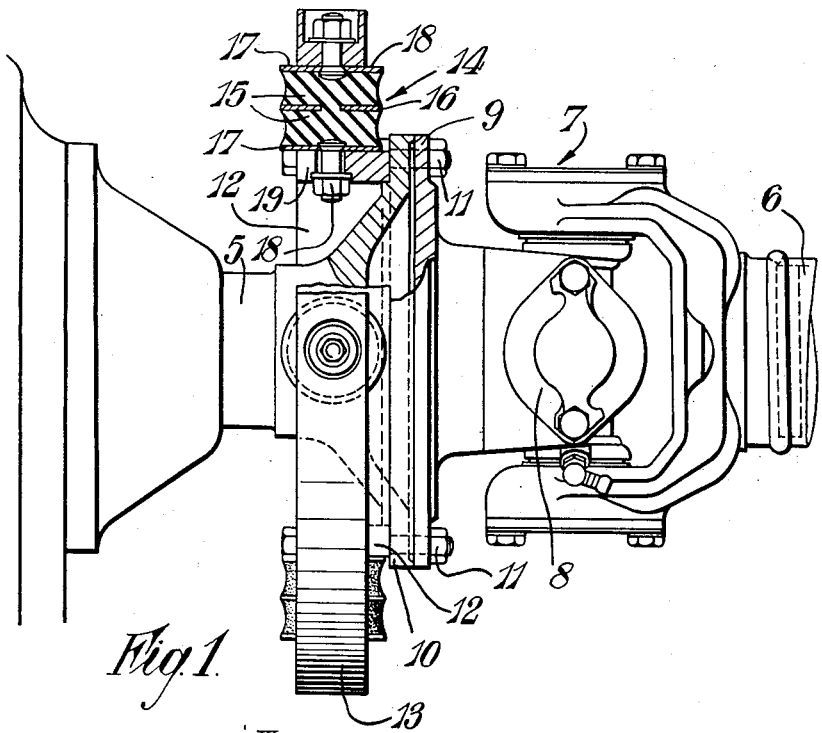
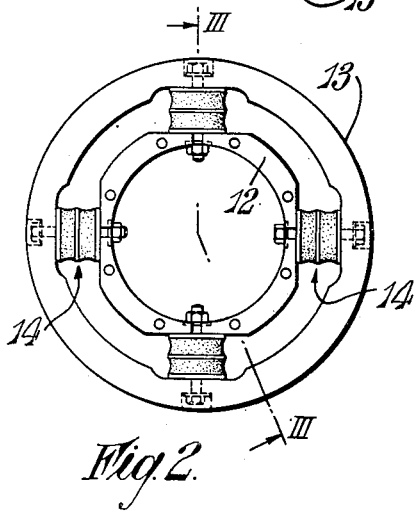
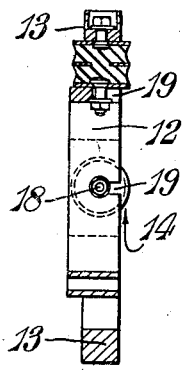
INVENTOR
ARCHIE JOHN HIRST
BY
Harness, Dickey & Pierce
ATTORNEYS

United States Patent Office 2,834,226
Patented May 13, 1958

2,834,226

TORSIONAL VIBRATION DAMPERS

Archie John Hirst, Leicester, England, assignor to Metalastik Limited, Leicester, England Application March 26, 1956, Serial No. 573,768

3 Claims. (Cl. 74—574)

This invention concerns torsional vibration dampers for the propeller shaft of a motor vehicle and relates more particularly to heavy goods and passenger road vehicles.

It has been found in many heavy road vehicles that a pronounced noise is present under certain operating conditions and it is believed that this is due to resonant torsional vibration in the propeller shaft transmission which causes the meshing gears of the gear box to come into, and out of, contact. The noise comes from the hammering of the gears and may be due not only to hammering of the driving faces of the gear teeth but to hammering of the back faces of the teeth where the vibration is severe. The object of this invention is to reduce or eliminate the disadvantage referred to in a simple manner. Accordingly, the invention provides a vibration damper comprising a ring-like inertia member, a hub member co-axial within the inertia member and adapted to constitute a part of the propeller shaft transmission and three or more equi-spaced rubber or the like vibration—damping elements clamped between the hub and inertia members and each disposed radially thereof.

A vibration damper according to this invention will now be described, by way of example only, with reference to the accompanying drawings whereof:

Fig. 1 is a side view of a part of the propeller shaft transmission of a heavy road vehicle, incorporating the vibration damper, the upper half of the view being partly in section.

Fig. 2 is an end view of the vibration damper of the transmission of Fig. 1 and

Fig. 3 is a section on the line III—III of Fig. 2.

Referring to Fig. 1: the transmission comprises a shaft 5 driven by the engine of the road vehicle through a gear box in conventional manner, a propeller shaft 6 by which the road wheels are driven (e. g. through a rear axle differential gear, not shown) and a universal joint 7 between shafts 5 and 6. The part 8 of the joint 7 has a flange 9 which is secured to a flange 10 of shaft 5 by bolts 11.

The vibration damper comprises a hub member 12 secured to flanges 9, 10 by bolts 11. The member 12 lies co-axially within a ring-like inertia member 13 and four equi-spaced rubber or the like cylindrical vibration—damping elements (generally indicated at 14) are clamped between the hub and inertia members.

Each element 14 comprises a pair of rubber or like discs 15, a metal interleaf 16 and metal plates 17 between which the discs are sandwiched. The discs are bonded to the interleaf 16 and to the plates 17. The element 14 thus constitutes a pre-formed assembly.

Each plate 17 has a stud 18 by which it is bolted either to member 13 or to member 12. The elements 14 are bolted to member 13 and then the elements are pre-compressed and member 12 is introduced axially to within the elements, the studs 18 sliding along slots 19 and being then drawn up. The elements are thus clamped between the hub and inertia members by the pre-compression and are further secured to the members by studs 18.

The elements 14 are in the form of bobbins which are radially disposed of the hub and inertia members.

Besides the ease of assembly of the vibration damper it will be appreciated that the elements can be readily removed and replaced without disconnecting the transmission or removing any other component of the damper.

The torsional stiffness required for the purpose indicated above is very low and with the construction described this is achieved while providing a hub member of a diameter convenient for fitment to the transmission without alteration thereof. In other words the hub member 12 may conveniently be of a size for attachment to the existing flanges 10, 11 of the transmission.

The interleaf 16 increases the radial stiffness of the element 14 and raises the permissible whirling speed. The interleaf may project sideways beyond discs 15 to provide for heat dissipation from the element.

The simple form of elements 14 enables their dynamic stiffness and damping properties to be easily checked during workshop inspection and if close control of torsional stiffness is essential this can be achieved by selecting suitable elements for use in sets of four (or whatever other numbers are provided) for the damper. Of course it will be understood that any number of elements more than three may be used in any given design of damper as is appropriate.

The plates 17 may be received in recesses in the hub and inertia members as an alternative (or an additional) attachment to the studs 18. The plates may have tapering edges to fit corresponding recesses.

The rubber discs 15 are joined together at their centres as shown in Fig. 1. However, this need not be so. Instead of bonding the discs to the interleaf 16 and plates 17 they may be integrally united in any other known or convenient way e. g. by a suitable adhesive.

What I claim is:

1. A torsional vibration damper for the propeller shaft of a motor vehicle comprising a ring-like inertia member, a hub member co-axial within the inertia member and at least three equi-spaced cylinders of rubber-like material each extending with its cylindrical axis radially of the hub and inertia members with which the end faces of the cylinders drivingly engage so that upon relative rotation of the members the cylinders are subject substantially entirely to shear whereby low torsional frequency is provided to de-tune the vibrations of the propeller shaft.

2. A torsional vibration damper for the propeller shaft of a motor vehicle comprising a ring-like inertia member, a hub member co-axial within the inertia member and at least three equi-spaced cylinders of rubber-like material each extending with its cylindrical axis radially of the hub and inertia members and being pre-compressed therebetween so that the end faces of the cylinders drivingly engage said members to provide that upon relative rotation of the members the cylinders are subject substantially entirely to shear whereby low torsional frequency is provided to de-tune the vibrations of the propeller shaft.

3. A torsional vibration damper for the propeller shaft of a motor vehicle comprising a ring-like inertia member, a hub member co-axial within the inertia member and at least three equi-spaced cylinders of rubber-like material, a pair of metal plates between which each of said cylinders is sandwiched, means for securing one of the pair of metal plates to the hub member, means for securing the other metal plate of the pair to the inertia member said securing means locating the cylinders each with its cylindrical axis radially of the hub and inertia members and being precompressed therebetween so that the end faces of the cylinders drivingly engage said members to provide that upon relative rotation of the members the cylinders are subject substantially entirely to shear whereby low torsional frequency is provided to detune the vibrations of the propeller shaft.

References Cited in the file of this patent

UNITED STATES PATENTS

| | | | |
|---|---|---|---|
| 1,641,230 | Manville | Sept. | 6, 1927 |
| 1,758,274 | Butenkoff | May | 13, 1930 |
| 1,822,026 | Guy | Sept. | 8, 1931 |
| 1,860,771 | Bugatti | May | 31, 1932 |
| 1,901,853 | Warner | Mar. | 14, 1933 |
| 1,984,413 | Lee | Dec. | 18, 1934 |
| 2,457,507 | Strachovsky | Dec. | 28, 1948 |
| 2,505,120 | Jackson | Apr. | 25, 1950 |